United States Patent [19]
Hart

[11] 3,724,533
[45] Apr. 3, 1973

[54] REGENERATOR SEAL

[75] Inventor: Jack P. Hart, Hinsdale, Ill.

[73] Assignee: General Motors Corporation, Detroit, Mich.

[22] Filed: Nov. 11, 1971

[21] Appl. No.: 197,674

[52] U.S. Cl..........................................165/7, 165/9
[51] Int. Cl..............................................F28d 19/04
[58] Field of Search............................165/8, 9, 10, 7

[56] References Cited

UNITED STATES PATENTS 3,384,156   5/1968   Addie..................................165/9 X
3,267,674   8/1966   Collman et al. ....................165/9 X Primary Examiner—Albert W. Davis, Jr.
Attorney—Paul Fitzpatrick et al.

[57] ABSTRACT

A rotary regenerator of the drum matrix type includes main seals engaging the matrix where it passes through the bulkhead of the regenerator. Each main seal includes a frame closely encircling the matrix including a housing extending across the hot side of the matrix. The matrix is guided and driven by rollers in the main seal frame. The roller at the hot side of the matrix includes a hollow shaft with a roller near each end of the shaft to engage the matrix. Thermal insulation covers substantially all the exposed surfaces of the shaft and rollers from edge to edge of the matrix. The ends of the shaft are mounted in spherical bearings and lubricating and cooling oil is circulated through the shaft. This disclosure incorporated by reference to the parent application, now U.S. Pat. No. 3,638,716.

3 Claims, 1 Drawing Figure

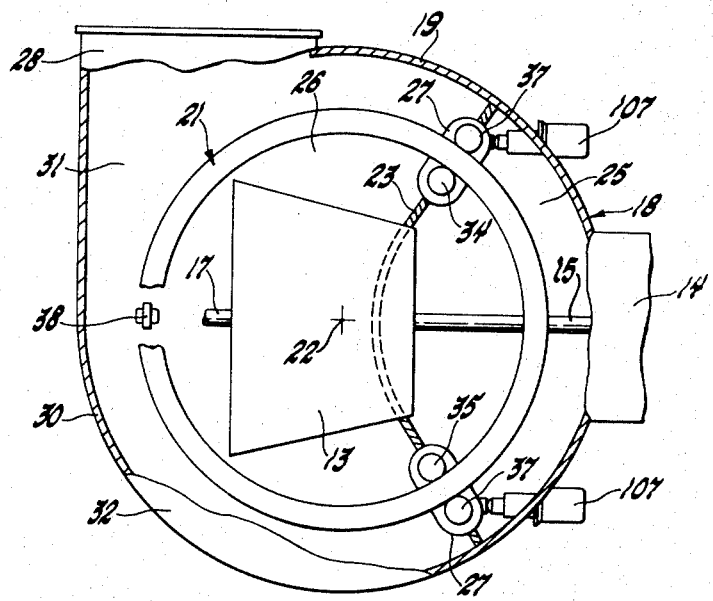

REGENERATOR SEAL

This application is a division of my application Ser. No. 879,729 for Regenerator Seal filed Nov. 25, 1969 now U.S. Pat. No. 3,638,716.

SUMMARY OF THE INVENTION

My invention relates to regenerators, by which I mean heat exchange devices of the sort in which a heat retaining mass is rotated so as to move alternately through the flow paths of two fluids so as to absorb heat from the hotter fluid and release it to the cooler. In some respects, it is particularly concerned with a regenerator having a drum matrix in which flow takes place radially through an annular drum, and with one suited to a gas turbine type of installation.

The particular subject matter of this application is a thermally insulated oil-cooled shaft assembly at the hot side of the regenerator in the main seal which supports and guides the matrix.

The principal object of the invention is to improve the durability and reliability of supporting shafts in hot environments, particularly in a rotary regenerator.

DESCRIPTION OF THE DRAWING

The FIGURE is a somewhat schematic side view, with parts cut away, of a regenerative gas turbine arrangements.

DETAILED DESCRIPTION

For a complete description of the regenerator seal of the FIGURE and of my invention claimed herein, reference is made to my U.S. Pat. application Ser. No. 879,729 for Regenerator Seal, filed Nov. 25, 1969, now U.S. Pat. No. 3,638,716.

Substantially the entire specification and drawings of that application are pertinent to an understanding of the subject matter of this invention in its preferred embodiment.

Reference is made to the specification and drawings of Ser. No. 879,729 which are incorporated herein by reference and made a part hereof as if fully described herein.

The portions of the disclosure of Ser. No. 879,729 which are most pertinent to the subject matter claimed are set out in column 4, lines 1 through 45 and column 8, lines 16 through 68 of the patent specification and in FIGS. 2, 3, 5, 6, 7, and 8 of the drawings; therefore, attention is particularly directed to those portions.

CONCLUSION

It should be clear to those skilled in the art from the foregoing that the seal described and claimed herein represents a significant improvement over prior art devices and is particularly suited to the requirements of gas turbine regenerator installations.

The detailed description of the preferred embodiment of the invention for the purpose of explaining the principles thereof is not to be considered as limiting or restricting the invention, as many modifications may be made by the exercise of skill in the art.

I claim:

1. A main seal for a rotary regenerator including a case, a bulkhead, a rotatable annular radial-flow matrix, and main seals cooperating with the matrix at the bulkhead; the main seal comprising, in combination, a housing including a first seal bar adapted to extend across the hotter face of the matrix, a second seal bar adapted to extend across the cooler face of the matrix, and side plates connecting and fixed to the seal bars and adapted to extend across the edges of the matrix; roller means rotatably mounted in each seal bar adapted to engage the faces of the matrix, the roller means in the first seal bar including a shaft, two rollers fixed to the shaft in position to engage the matrix near its edges, and insulation substantially covering the said shaft and rollers from edge to edge of the matrix; bearing means for the said shaft outboard of the rollers; and means for circulating a cooling medium through the shaft.

2. A main seal for a rotary regenerator including a case, a bulkhead, a rotatable annular radial-flow matrix, and main seals cooperating with the matrix at the bulkhead; the main seal comprising, in combination, a housing including a first seal bar adapted to extend across the hotter face of the matrix, a second seal bar adapted to extend across the cooler face of the matrix, and side plates connecting and fixed to the seal bars and adapted to extend across the edges of the matrix; roller means rotatably mounted in each seal bar adapted to engage the faces of the matrix, the roller means in the first seal bar including a shaft, two rollers fixed to the shaft in position to engage the matrix near its edges, and insulation substantially covering the said shaft and rollers from edge to edge of the matrix; spherical bearing means for the said shaft outboard of the rollers substantially in the plane of the seal plates; and means for circulating a cooling medium through the shaft.

3. A main seal for a rotary regenerator including a case, a bulkhead, a rotatable annular radial-flow matrix, and main seals cooperating with the matrix at the bulkhead; the main seal comprising, in combination, a housing including a first seal bar adapted to extend across the hotter face of the matrix, a second seal bar adapted to extend across the cooler face of the matrix, and side plates connecting and fixed to the seal bars and adapted to extend across the edges of the matrix; roller means rotatably mounted in each seal bar adapted to engage the faces of the matrix, the roller means in the first seal bar including a shaft, two rollers fixed to the shaft in position to engage the matrix near its edges, and insulation substantially covering the said shaft and rollers from edge to edge of the matrix; bearing means for the said shaft outboard of the rollers; and means for circulating a cooling medium through the shaft including means for introducing a lubricant at one end of the shaft; means for bleeding lubricant from the shaft to lubricate the said bearings, and means for flowing oil from the other end of the shaft to assure sufficient lubricant circulation to cool the shaft.

* * * * *